Nov. 29, 1955     W. P. TAYLOR, JR     2,725,197
MACHINE FOR WINDING FLEXIBLE MATERIAL
Filed March 1, 1954     2 Sheets-Sheet 1
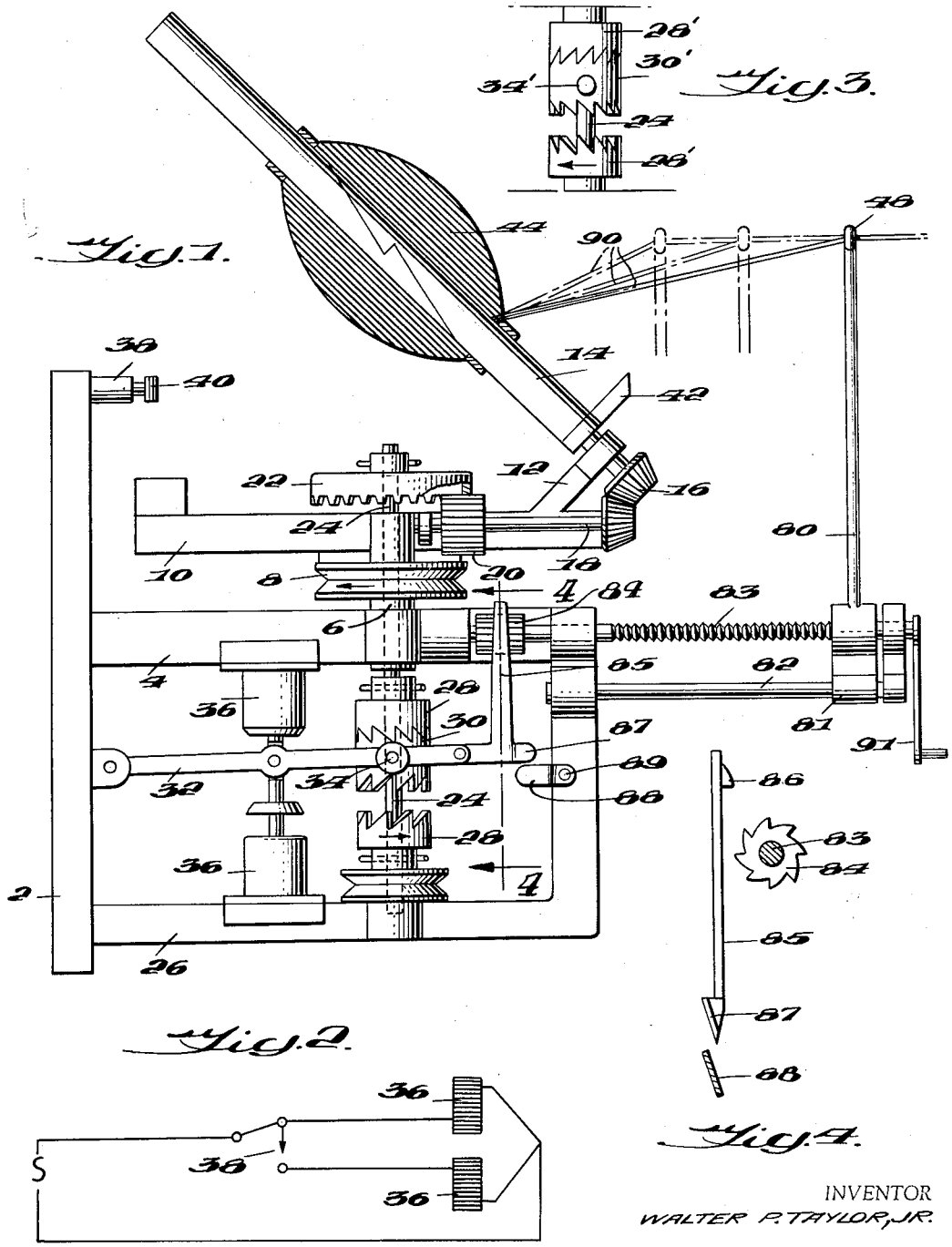
INVENTOR
WALTER P. TAYLOR, JR.
BY Bailey, Stephens and Huettig
ATTORNEYS Nov. 29, 1955

W. P. TAYLOR, JR 2,725,197

MACHINE FOR WINDING FLEXIBLE MATERIAL

Filed March 1, 1954

INVENTOR
WALTER P. TAYLOR, JR.

BY Bailey, Stephens and Huettig

ATTORNEYS

United States Patent Office 2,725,197
Patented Nov. 29, 1955

2,725,197

MACHINE FOR WINDING FLEXIBLE MATERIAL

Walter P. Taylor, Jr., New York, N. Y.

Application March 1, 1954, Serial No. 413,015

11 Claims. (Cl. 242—2)

The invention relates to the winding of flexible material and more particularly to a machine for winding packages of flexible material from which the material can be withdrawn without kinks or twists.

This is a continuation in part of my application Serial No. 344,876, filed March 26, 1953, now abandoned.

In my prior Patent No. 2,634,922, I have described a package of flexible material in which a series of coils each forming at least one figure 8 are so arranged that successive crossovers of the coils are displaced angularly around the axis of the package, the spacing between successive coils being varied at one point to provide an opening into the package through which the inner free end of the material can be drawn out. In the patent of myself and Jack van Horn Whipple, No. 2,634,918, a machine for making such a package is described.

In my application Serial No. 344,875, filed March 26, 1953, I have described a machine in which a guide for flexible material is moved towards or from a spindle rotating about a fixed axis as the material is wound on the spindle.

The primary object of the present invention is to provide a simplified machine for winding such packages.

Another object of the invention is to provide a machine which can be made comparatively small so as to occupy very little space.

A further object of the invention is to provide a machine which has relatively few parts, and is therefore inexpensive in construction and maintenance.

Still another object of the invention is to provide, in a machine of this type, an arrangement for changing the angle at which the material is fed to the spindle as the package is built up on the spindle.

Further objects and advantages of the invention will appear more fully from the following description, especially when taken in conjunction with the accompanying drawings which form a part thereof.

In the drawings:

Fig. 1 shows in side elevation a machine embodying my invention;

Fig. 2 is a diagram of the electric circuit thereof;

Fig. 3 shows a part of a modified form of machine;

Fig. 4 is a detail view, substantially on the line 4—4 of Fig. 1.

Figure 5:
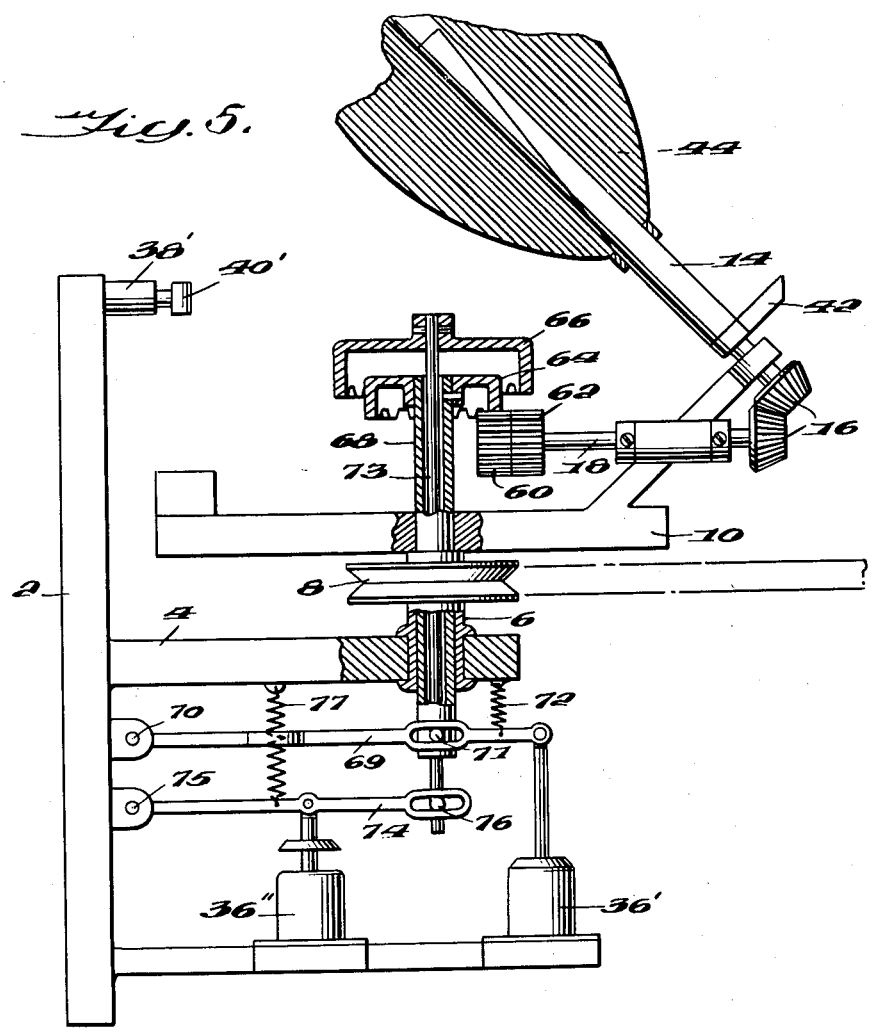
Fig. 5 shows in side elevation with parts in section another form of machine.

The machine is mounted on a base 2 which should be solidly supported. Rotatably mounted in arm 4 of base 2 is a hollow shaft 6 driven by a pulley 8 from any suitable source and carrying a frame 10. Rotatably mounted in this frame by angle arm 12 is a spindle 14, the axis of which is inclined to the axis of shaft 6. The spindle through bevel gears 16 is driven by shaft 18 rotatably mounted in the frame. Shaft 18 has a gear 20 meshing with crown gear 22 on the upper end of a shaft 24 which extends downward through hollow shaft 6. The lower end of shaft 24 is mounted in arm 26 of base 2. The shaft carries, between the arms 4 and 26, a pair of oppositely facing clutch members 28. These members have teeth each provided with one straight side and one inclined side, the inclinations of the teeth on the two parts converging around the axis of the spindle. However, the points of the teeth of one part are set half way between those of the teeth of the other part.

A clutch member 30 is slidable on shaft 24 between clutch parts 28. This member 30 can be moved by lever 32 pivoted on base 2, pivots 34 preventing clutch member 30 from rotating. The clutch member has at each end teeth which mesh with the teeth on clutch parts 28.

A pair of solenoids 36 are mounted on arms 4 and 26 and connected to lever 32. Base 2 also carries a single-pole, double-throw switch 38 operated to open one circuit and close another by pushing button 40. Spindle 14 carries a switch actuating arm 42 which can at times, as will be explained below, engage button 40.

The spindle may be of any suitable type, but I prefer to use a spindle having a bulge so as to form a package which has a central core with reduced ends. This may be of the type shown in my application for Winding Flexible Material, Serial No. 344,875, filed March 26, 1953. For example, it may have a strip of flexible material 44 of progressively diminishing width wound on the spindle.

Flexible material is supplied to the spindle from a source by a guide 48. For some purposes, it may be desirable to provide for varying the distance between the guide and the spindle.

This variation is accomplished by mounting guide 48 on a rod 80 upstanding from a piece 81 slidable on fixed bar 82 and threadedly engaging a rotatable screw 83. Screw 83 carries a ratchet 84. Secured on arm 32 is a pawl piece 85 formed of spring metal and having at its upper end a pawl tooth 86. Piece 85 has a slanted part 87, moving opposite a slanted member 88 mounted by screw 89 on frame 4. The piece 85 is so made that it normally lies in a plane spaced from ratchet 84, as shown in Fig. 4, so that in its downward movement it would not engage with ratchet 84.

This machine operates as follows:

Normally gear 22 is held stationary by engagement of clutch member 30 with one of clutch parts 28. Thus, when frame 10 is rotated, gear 20 is also rotated since it is carried around by the rotation of the frame 10, on which it is mounted, while engaging stationary gear 22. Rotation of shaft 18 acts through bevel gears 16 to drive spindle 14. The gears 16, 20, 22 are so chosen that spindle 14 is driven slightly out of phase with frame 10, preferably so that for a given number of rotations of the frame the spindle rotates a number of times which is slightly different from an integral multiple of one half the number of revolutions of the frame. For example, the spindle may rotate sixty-one times for each thirty revolutions of the frame (plus wind).

Such operation would, if uninterrupted, form successive layers on the spindle each composed of a plurality of figure 8 coils, the crossovers of successive coils progressing angularly around the package.

However, this action is interrupted in the present machine. At each successive rotation of the frame, arm 42 will occupy a different angular position around the axis of the spindle as it passes switch 38, because the rotation of the spindle and frame are out of phase. Therefore, as a layer of coils is almost completed, arm 42 will be in its uppermost position as it passes switch 38 and will engage button 40.

Assuming that the parts have been in the position shown in Fig. 1, with the upper solenoid energized, when button 40 is pushed it will change switch 38 to its other position and will energize the lower solenoid. This will pull down clutch member 30 to disengage the upper clutch part 28 and engage the lower one. Because the teeth of the two clutch parts are out of alignment, the cooperating sloping parts of the engaging teeth of the clutch member and the lower clutch part will cause the lower clutch part to rotate through an angle equal to half the space between successive teeth.

This rotation of lower clutch part 28 is imparted by shaft 24 to gear 22, rotating that gear and causing the spindle to rotate quickly through a small angle in addition to its normal rotation. This will cause a displacement of the coils, or a greater than normal space between successive coils. This produces gutters of the type described in my prior application referred to above, and forms an opening in each layer.

After the next layer is formed, the machine operates again to energize the upper solenoid, giving a further sudden movement of the spindle and forming a gutter and an opening in the next layer. Since switch 38 is always operated at the same angular position of the spindle, these openings are aligned, and the free inner end of the material can be drawn out through them.

In the event that the device is to wind with a minus wind, gear 22 is so chosen as to produce for example fifty-nine rotations of the spindle for each thirty revolutions of the frame. In such a machine, the teeth of members 28', 30' (Fig. 3) are slanted in the opposite direction. Otherwise, the machine is the same as that shown in Fig. 1.

With the parts 80 to 89 in the position shown, at each down stroke of arm 32 part 87 will engage the upper (right-hand in Fig. 4) side of piece 88, pushing piece 85 to the right so that tooth 86 will engage one of the ratchet teeth and turn the screw 83. On the up stroke, the part 87 will engage the lower face of piece 89, and will be moved to the left out of engagement with ratchet 84.

As a result, the guide wil be slowly moved towards or from the package as it is wound on spindle 14 in a direction depending on the direction of screw thread 83. This will change the angle at which the flexible material is wound, as indicated by broken lines 90.

If the guide is to remain stationary, it can be set in any desired position by turning crank 91, and the piece 88 can be turned down, by loosening screw 89, out of the path of piece 87. Tooth 86 then will not engage ratchet 84.

It will be noted that the guide 48 moves in a linear path which is at right angles to the axis of shaft 6 through its intersection with the axis of spindle 14.

Fig. 5 shows a modification which will produce crossovers progressing angularly around the spindle in opposite directions in successive layers. Such a package is described in detail in my application Serial Number 344,875, filed March 26, 1953.

In this figure, frame 10 is driven by pulley 8 and carries spindle 14 driven by gears 16 from shaft 18. Shaft 18 however carries two gears 60, 62 engageable respectively with crown gears 64, 66. Gear 64 is mounted on sleeve 68 which is slidable in shaft 6. In arm 69 pivoted at 70 on frame 2 are pins 71 engaging sleeve 68. A spring 72 urges arm 69 and sleeve 68 upwardly. Gear 66 is mounted on a shaft 73 slidable in sleeve 68. Arm 74 pivoted at 75 on frame 2 engages shaft 73 by pins 76. A spring 77 urges arm 74 and shaft 73 upward. Solenoids 36', 36" are connected to arms 69, 74 respectively to pull downward on these arms when the solenoids are energized.

Gears 60, 62, 64 and 66 are so chosen that spindle 14 is slightly out of phase with table 10 in one sense when gears 60, 64 are engaged and in the opposite sense when gears 62, 66 are engaged. For example, for each thirty rotations of the frame, the spindle will rotate sixty-one times when gears 62, 66 are engaged and fifty-nine times when gears 60, 64 are engaged. Thus, when one set of gears is engaged the crossovers of successive coils will progress angularly around the package in one direction, while when the other gears are engaged the crossovers will progress in the other direction.

Assuming the solenoid 36' to be energized, arm 69 and sleeve 68 are pulled down against the action of spring 72 and gears 60, 64 will be engaged. Near the completion of the layer, the switch 38' will be operated and the solenoid 36" energized to pull down arm 74 and shaft 73 to engage gears 62, 66 and change the ratio, so that the crossover progress in the opposite direction, sleeve 68 being raised by spring 72 to disengage gears 64, 60 as soon as solenoid 36' is deenergized. This will also leave an opening through successive layers into the package.

Figure 6:
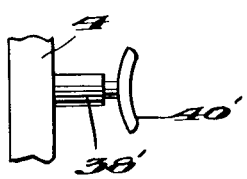
Fig. 6 is a detail of Fig. 5.

The operating member 40' of switch 38', as shown in Fig. 6, has sufficient angular extent so that the switch is operated to change from one solenoid to another before a complete layer is formed.

The invention is applicable both to resilient or relatively rigid flexible materials, such as wire and tubing, as well as to textiles such as yarn, thread, cord or rope. However, the guiding member should have an internal cross-section at least somewhat larger than that of the flexible material so as to avoid frictional drag.

While I have described herein some embodiments of my invention, I wish it to be understood that I do not intend to limit myself thereby except within the scope of the claims hereto or hereinafter appended.

I claim:

1. A machine for winding flexible material comprising a spindle, means to impart to said spindle bodily motion about an axis tilted with respect to the axis of the spindle and to rotate said spindle around its axis at a speed slightly out of phase with the speed of bodily motion so that during a given number of such bodily motions the spindle rotates a number of times which is slightly different from an integral multiple of one half the number of such bodily motions, so as to lay up on the spindle successive layers of flexible material each composed of a series of coils each forming at least one figure 8, and means controlled in synchronism with the rotation of the spindle and such bodily motions to vary the relative rate of rotation of the spindle with respect to such bodily motion at least once in each layer and at substantially the same angular position of the spindle to form an opening through the layers transverse to the axis of the spindle.

2. A machine for winding flexible material comprising a frame, means to rotate said frame about an axis, a spindle mounted on said frame to rotate about an axis tilted with respect to the axis of rotation of the frame, means to rotate said spindle around its axis at a speed slightly out of phase with the speed of rotation of the frame about its axis so that during a given number of rotations of the frame the spindle rotates a number of times which is slightly different from an integral multiple of one half the number of rotations of the frame, so as to lay up on the spindle successive layers of flexible material each composed of a series of coils each forming at least one figure 8, and means controlled in synchronism with the rotation of the spindle and frame to vary the relative rate of rotation of the spindle and frame at least once in each layer and at substantially the same angular position of the spindle to form an opening through the layers transverse to the axis of the spindle.

3. A machine for winding flexible material comprising a shaft mounted for rotation, a frame carried by said shaft, means to rotate said shaft, a spindle mounted on said frame to rotate about an axis tilted with respect to the axis of the shaft, a gear connected to said spindle, a second shaft mounted in said frame to rotate about an axis perpendicular to the axis of the first shaft, a second gear on said second shaft meshing with the first gear, a third gear on said second shaft, a fourth gear meshing with said third gear, and means normally holding said fourth gear stationary, the ratio of said gears being such as to rotate said spindle around its axis at a speed slightly out of phase with the speed of rotation of the frame about its axis so that during a given number of rotations of the frame the spindle rotates a number of times which is slightly different from an integral multiple of one half the number of rotations of the frame, so as to lay up on the spindle successive layers of flexible material each composed of a series of coils each forming at least one figure 8, and means controlled in synchronism with the rotation of the spindle and frame to impart motion to said normally fixed gear so as to vary the relative rate of rotation of the spindle and frame at least once in each layer and at substantially the same angular position of the spindle to form an opening through the layers transverse to the axis of the spindle.

4. In a machine as claimed in claim 3 having a third shaft within the first shaft, said fourth gear being mounted on said third shaft.

5. In a machine as claimed in claim 4, said motion imparting means comprising a pair of members fixed on said third shaft for rotation therewith, said members having oppositely directed inclined teeth on their facing edges out of alignment with one another, a piece non-rotatably mounted between said members, said third shaft being turnable in said piece and said piece being slidable along the third shaft, said piece having on its opposite ends aligned teeth matching the teeth on said members, and means for alternately shifting said piece to engage one or the other of said members once in each layer.

6. In apparatus as claimed in claim 1, a guide for flexible material, and means to move said guide towards the spindle in synchronism with the movement of the spindle.

7. Apparatus as claimed in claim 6 in which the guide is moved in a straight line perpendicular to the first axis and through the intersection of the axes.

8. In apparatus as claimed in claim 2, a guide for flexible material, and means to move said guide towards the spindle in synchronism with the movement of the spindle.

9. Apparatus as claimed in claim 8 in which the guide is moved in a straight line perpendicular to the axis of rotation of the frame through the intersection of said axis with the axis of the spindle.

10. In a machine as claimed in claim 1, said means for varying the relative rate of rotation of the spindle with respect to such bodily motion comprising means for making the number of rotations of the spindle first slightly more than and then slightly less than an integral multiple of one-half the number of such bodily motions, said varying means operating once in each layer.

11. A machine for winding flexible material comprising a shaft mounted for rotation, a frame carried by said shaft, means to rotate said shaft, a spindle mounted on said frame to rotate about an axis tilted with respect to the axis of the shaft, a gear connected to said spindle, a second shaft mounted in said frame to rotate about an axis perpendicular to the axis of the first shaft, a second gear on said second shaft meshing with said first gear, third and fourth gears on said second shaft, a third shaft mounted inside said first shaft, a fourth shaft mounted inside said third shaft, fifth and sixth gears on said third and fourth shafts means controlled in synchronism with the rotation of the spindle and frame for shifting said fifth and sixth gears alternately into mesh with the third and fourth gears respectively once in each layer, said third and fourth shafts being non-rotatable, the ratio between one of the third and fifth and the fourth and sixth pairs of gears being such that the spindle rotates a number of times which is slightly less than, and the ratio of the other pair of gears being such that the spindle rotates a number of times which is slightly more than, an integral multiple of one-half the number of revolutions of the frame, so as to lay up on the spindle successive layers of flexible material each composed of a series of coils each forming at least one figure 8, the crossovers of successive coils progressing angularly around the spindle in opposite directions in successive layers.

References Cited in the file of this patent

UNITED STATES PATENTS

| 262,412 | Hirt | Aug. 8, 1882 |
| 2,103,347 | Bartholomew | Dec. 28, 1937 |
| 2,617,601 | Osborne | Nov. 11, 1952 |